(12) United States Patent
Benage

(10) Patent No.: US 7,125,475 B2
(45) Date of Patent: Oct. 24, 2006

(54) NITROSOPHENOLS AND C-NITROSOANILINES AS POLYMERIZATION INHIBITORS

(75) Inventor: Brigitte Benage, Wolcott, CT (US)

(73) Assignee: Crompton Corporation, Middlebury, CT (US)

( * ) Notice: Subject to any disclaimer, the term of this patent is extended or adjusted under 35 U.S.C. 154(b) by 265 days.

(21) Appl. No.: 10/353,647

(22) Filed: Jan. 29, 2003

(65) Prior Publication Data

US 2003/0155227 A1 Aug. 21, 2003

Related U.S. Application Data

(60) Provisional application No. 60/357,346, filed on Feb. 15, 2002, provisional application No. 60/357,342, filed on Feb. 15, 2002.

(51) Int. Cl.
*B01D 3/34* (2006.01)
*C07C 7/20* (2006.01)
*C07C 7/05* (2006.01)

(52) U.S. Cl. ............ 203/8; 203/9; 203/49; 208/48 AA; 252/461; 252/405; 252/407; 585/4; 585/950; 562/600

(58) Field of Classification Search ............ 203/8, 203/9, 49, 100; 208/48 AA; 585/5, 435, 585/4, 950; 252/401, 405, 407; 562/600
See application file for complete search history.

(56) References Cited

U.S. PATENT DOCUMENTS

| 3,527,822 | A | | 9/1970 | Benson |
| 3,964,979 | A | | 6/1976 | Watson |
| 3,988,212 | A | * | 10/1976 | Watson ............... 203/9 |
| 4,013,580 | A | * | 3/1977 | Hayashi et al. ............ 570/104 |
| 4,210,493 | A | | 7/1980 | Stewart et al. |
| 4,341,600 | A | * | 7/1982 | Watson ............... 203/9 |
| 4,654,451 | A | | 3/1987 | Miller et al. |
| 4,929,778 | A | * | 5/1990 | Roling ............... 585/3 |
| 4,967,027 | A | * | 10/1990 | Takahashi et al. ............ 585/5 |
| 5,034,156 | A | * | 7/1991 | Varwig ............... 252/403 |
| 5,254,760 | A | * | 10/1993 | Winter et al. ............ 585/5 |
| 5,396,004 | A | * | 3/1995 | Arhancet et al. ............ 585/5 |
| 5,545,782 | A | | 8/1996 | Winter et al. |

FOREIGN PATENT DOCUMENTS

| EP | 1044957 A1 | 10/2000 |
| JP | 03149205 | * 6/1991 |
| JP | 2000 327617 | 11/2000 |
| JP | 2001 226334 | 8/2001 |
| KR | 2002 008993 A | 7/2002 |
| WO | PCT WO99/50221 | 10/1999 |
| WO | PCT WO02/33025 A2 | 4/2002 |

OTHER PUBLICATIONS

Ermilov et al. "*Inhibited Polymerization of N,N,N-Trimethylammonioethyl Methacrylate Methyl Sulfate*" appearing n Macromolecular Chemistry and Polymeric Materials, Russian Journal of Applied Chemistry, vol. 74, No. 9, 2001, pp. 1577-1580 (2001).
Tudo et al., "*Free-Radical Polymerization: Inhibition and Retardation*" appearing in Prog. Polym. Sci. vol. 14, pp. 717-761 (1989)
Francoise Lartigue-Peyrou "*The Use of Phenolic Compounds as Free-Radical Polymerization Inhibitors*" Roots of Organic Chemistry, appearing in Journal Chem.Lib. vol. 8, pp. 489, 495 (1996).

* cited by examiner

*Primary Examiner*—Virginia Manoharan
(74) *Attorney, Agent, or Firm*—Daniel Reitenbach

(57) ABSTRACT

Inhibitor blends that include both nitrosophenols and nitrosoanilines, optionally in combination with air or oxygen, reduce the premature polymerization of ethylenically unsaturated monomers. unsaturated monomers.

12 Claims, No Drawings

NITROSOPHENOLS AND C-NITROSOANILINES AS POLYMERIZATION INHIBITORS

This application claims the benefit under Title 35, United States Code, § 120 of the U.S. Provisional Application No. 60/357,346, filed Feb. 15, 2002, entitled "Blends of Nitrosophenols and C-Nitrosoanilines as Polymerization Inhibitors" and U.S. Provisional Application No. 60/357,342, filed Feb. 15, 2002 entitled "Nitrosophenols and Air as Polymerization Inhibitors"

BACKGROUND OF THE INVENTION

1. Field of the Invention

This invention relates to compositions and methods of using blends of nitrosophenol and C-nitrosoaniline compounds, optionally in combination with air or oxygen, to prevent the premature polymerization of ethylenically unsaturated monomers.

2. Description of the Related Art

Many ethylenically unsaturated monomers undesirably polymerize at various stages of their manufacture, processing, handling, storage and use. It is well known that ethylenically unsaturated monomers such as styrene or alpha-methylstyrene have a strong tendency to polymerize when subjected to elevated temperatures. Manufacturing processes for such monomers typically include distillations at elevated temperatures. A particularly troublesome problem is equipment fouling caused by polymerization during the manufacture of such monomers. Polymerization, such as thermal polymerization, results in the loss of the monomer and a loss in production efficiency owing to the deposition of polymer in or on the manufacturing equipment, the deposits of which must be removed from time to time. Additionally, the formation of soluble polymer leads to loss of monomer, i.e., a lower yield, and an increase in the viscosity of any tars that may be produced. The processing of the tars then requires higher temperature and work (energy cost) to remove residual monomer.

A wide variety of compounds have been proposed and used for inhibiting uncontrolled and undesired polymerization of ethylenically unsaturated monomers. These include elemental sulfur and many classes of organic chemicals. These materials have met with varying degrees of success in industrial use. Included among these organic materials are nitrosophenol and nitrosoaniline compounds, see, for example, F. Lartigue-Peyrou in Ind. Chem. Libr., 8 (Roots of Organic Development), 1996, 489–505; *Prog. Polym. Sci.*, F. Tudos, T. Foldes-Berezsnich, 14, 1989, 717–761; Hung. 150,550; U.S. Pat. No. 4,654,451; U.S. Pat. No. 4,210,493; *Eur. Polym. J.*, F. Tudos et. al., 18(4), 1982, 295–9; 19(7), 1983, 593–5; 8(11), 1972, 1281–9; 30(12), 1994, 1457–9; 19(3), 1983, 225–9; 19(2), 1983,153–18(6), 1982, 487–91, the contents of each of which are incorporated by reference herein There remains a need, however, for an inhibitor that not only provides highly effective inhibition of polymerization during normal operation of a continuous manufacturing or purification process, but also provides satisfactory protection in the event of a loss of continuous inhibitor feed. While many inhibitors are known to provide sufficient protection in one of these scenarios, they have not been fully satisfactory under both normal and upset operating conditions.

Accordingly, a substantial need continues in the art for improved compositions for inhibiting the polymerization of such monomers during their production and during the distillation process for purifying or separating them from impurities, as well as during transport and storage.

SUMMARY OF THE INVENTION

In accordance with one embodiment of the invention, a process is provided for inhibiting the premature polymerization of an ethylenically unsaturated monomer during production, distillation, purification or storage, which comprises:

incorporating in the monomer, in an effective inhibiting amount sufficient to prevent premature polymerization during production, distillation, purification or storage of said monomer, a blend comprising at least one nitrosophenol compound and at least one nitrosoaniline compound. In accordance with another embodiment, the blend further comprises oxygen or air to enhance the inhibiting activity of the blend.

In another embodiment of the invention, a composition is provided which comprises:

(a) an ethylenically unsaturated monomer, and (b) an effective inhibiting amount, sufficient to prevent premature polymerization of said ethylenically unsaturated monomer, of a blend comprising at least one nitrosophenol compound and at least one nitrosoaniline compound. In yet another embodiment, the blend further comprises oxygen or air to enhance the inhibiting activity of the blend.

In yet another embodiment of the invention, a method for distilling a feed containing at least one polymerizable ethylenically unsaturated monomer is provided, said method comprising the steps of:

introducing a feed comprising at least one polymerizable ethylenically unsaturated monomer into a distillation apparatus;

introducing an effective inhibiting amount, sufficient to prevent premature polymerization of said ethylenically unsaturated monomer, of a blend comprising at least one nitrosophenol compound and at least one nitrosoaniline compound into said distillation apparatus; and distilling said feed under distillation conditions in the presence of said inhibitor blend to recover from said distillation apparatus an overhead product of high purity ethylenically unsaturated monomer and a residual bottoms fraction having a reduced content of polymeric material. In accordance with a preferred embodiment, oxygen or air is also introduced to the distillation apparatus.

In cases where oxygen-free conditions are preferred as standard operating mode, but the advantageous inhibition enhancement effects of oxygen or air are still desired, oxygen or air can still be introduced to quench any polymerization that may have started during upset conditions, thus to avert any disastrous runaway polymerizations from occurring.

The term "nitrosoaniline" utilized throughout the specification and claims shall be understood as referring specifically to C-nitrosoaniline compounds.

DETAILED DESCRIPTION OF THE INVENTION

The instant invention pertains to a composition which comprises:

(a) an ethylenically unsaturated monomer, and (b) an effective inhibiting amount, sufficient to prevent premature polymerization of said ethylenically unsaturated monomer, of a blend comprising at least one nitrosophenol compound and at least one nitrosoaniline compound.

The effective amount of the blend will range from 1 to 2000 ppm, preferably from 5 to 1000 ppm, based on the weight of component (a).

The ratio of nitrosophenol compound to C-nitrosoaniline compound may range broadly from 1:99 to 99:1, preferably from 20:80 to 80:20, and most preferably from 40:60 to 60:40.

When employed, the effective amount of oxygen or air is 1 ppm to about 1000 ppm, based on the weight of component (a). The upper practical limit for this amount will be determined by safety considerations.

The ethylenically unsaturated monomer, the premature polymerization of which is an object of the present invention, can be any such monomer for which unintended polymerization during its manufacture, storage, and/or distribution is a problem. Among those monomers that will benefit from the practice of the present invention are: styrene, alpha-methylstyrene, styrene sulfonic acid, vinyltoluene, divinylbenzenes, polyvinylbenzenes, alkylated styrene, 2-vinylpyridine, acrylonitrile, methacrylonitrile, methyl acrylate, ethyl acrylate, butyl acrylate, methyl methacrylate, ethyl methacrylate, acrylic acid, methacrylic acid, butadiene, chloroprene, isoprene, and the like.

Preferably, the ethylenically unsaturated monomer is styrene, alpha-methylstyrene, vinyltoluene or divinylbenzene, and more preferably, styrene.

The instant invention also pertains to a process for inhibiting the premature polymerization of an ethylenically unsaturated monomer during production, distillation, purification or storage of the monomer which comprises:

incorporating in the monomer, in an effective inhibiting amount sufficient to prevent premature polymerization during production, distillation, purification or storage of said monomer, a blend comprising at least one nitrosophenol compound and at least one nitrosoaniline compound. In accordance with a preferred embodiment, the blend additionally contains oxygen or air to enhance the inhibition activity of the blend.

The ethylenically unsaturated monomer is typically distilled or purified at temperatures ranging from 50° C. to 150° C. The blend is added to the ethylenically unsaturated monomer continuously or intermittently before or during the point where distillation or purification occurs, or the blend can be added at different entry points into the ethylenically unsaturated monomer process stream before or during the point where distillation or purification occurs. It will be understood by those skilled in the art that the blend can be produced in situ within the monomer by separately introducing the nitrosophenol and nitrosoaniline compounds to the monomer.

The instant process can be conducted under anaerobic conditions, or can be started under either anaerobic or aerobic conditions with oxygen or air then being added continuously or intermittently thereafter to the ethylenically unsaturated monomer to prolong polymerization inhibition time or to short-stop incipient polymerization. The instant process can also be conducted under inherently aerobic conditions where additional air or oxygen is not added since sufficient air or oxygen to enhance the inhibiting activity of the blend is inherently present.

Nitrosophenols exemplified by, but not limited to, the list below can be employed in the practice of the present invention:
4-nitrosophenol;
2-nitrosophenol;
4-nitroso-o-cresol;
2-nitroso-p-cresol;
2-trot-butyl-4-nitrosophenol;
4-tert-butyl-2-nitrosophenol;
2,6-di-tert-butyl-4-nitrosophenol;
2-tert-amyl-4-nitrosophenol;
4-tert-amyl-2-nitrosophenol;
2,6-di-tert-amyl-4-nitrosophenol;
2-nitroso-1-naphthol;
4-nitroso-1-naphthol;
2-tert-butyl-4-nitroso-1-naphthol;
1-nitroso-2-naphthol;
6-nitroso-2-naphthol; and
2-tert-amyl-nitroso-1-naphthol.

Nitrosoanilines exemplified by, but not limited to, the list below can be employed in the practice of the present invention:
4-nitroso-N-(1,4-dimethylpentyl)aniline
4-nitroso-N-phenylaniline
4-nitroso-N-isopropylaniline
4-nitroso-N,N-dimethylaniline
4-nitroso-N,N-diethylaniline
4-nitroso-N,N-diphenylaniline
4-nitroso-N,N-diisopropylaniline
4-nitrosoaniline
2-nitroso-N-(1,4-dimethylpentyl)aniline
2-nitroso-N-phenylaniline
2-nitroso-N,N-dimethylaniline
2-nitroso-N,N-diethylaniline
2-nitroso-N,N-diphenylaniline
2-nitrosoaniline
2-t-butyl-4-nitroso-N-(1,4-dimethylpentyl)aniline
2-methyl-4-nitroso-N-(1,4-dimethylpentyl)aniline
2-t-butyl-4-nitroso-N-phenylaniline
2-methyl-4-nitroso-N-phenylaniline
4-t-butyl-2-nitroso-N-(1,4-dimethylpentyl)aniline
4-t-butyl-2-nitroso-N-phenylaniline
4-t-butyl-2-nitroso-N,N-dimethylaniline
4-t-butyl-2-nitroso-N,N-diethylaniline
4-nitroso-N-(1,3-dimethylbutyl)aniline
2-nitroso-N-(1,3-dimethylbutyl)aniline
4-t-butyl-2-nitroso-N,N-diphenylaniline, and
4-t-butyl-2-nitrosoaniline.

The effective amount of the inhibitor blend added may vary over wide ranges depending upon the particular ethylenically unsaturated monomer and the conditions of distillation. Preferably, the total amount of the blend is from 1 ppm to about 2000 ppm based upon the weight of the monomer being inhibited. For most applications, the inhibitor system is used in the range of 5 to 1000 ppm. As the temperature increases, greater amounts of inhibitor are required. During distillation of the ethylenically unsaturated monomer, the temperature of the reboiler is normally in the range from 50° C. to about 150° C. The polymerization inhibitor blend can be introduced into the monomer by any conventional method. It may be added as a concentrate solution in suitable solvents just upstream of the point of desired application by any suitable means. For example, the individual inhibiting components can be injected separately or in combination to the monomer feed tank prior to injection into a distillation train. The individual inhibiting components can also be injected separately into the distillation train along with the incoming feed or through separate entry points, provided there is an efficient distribution of the inhibitors. Since the inhibitor blend is gradually depleted during operation, it is generally necessary to maintain the appropriate amount of the inhibitor blend in the distillation apparatus by adding inhibitor during the course of the distillation process. Such addition may be carried out either on a generally continuous basis or it may consist of intermittently charging inhibitor into the distillation system when the concentration of inhibitor is to be maintained above the minimum required level.

It is also within the purview of the instant invention that the ethylenically unsaturated monomer may also contain a solvent such as ethylbenzene, or contain dissolved polymer, or contain material produced during the process of production and purification, such as the bottoms of a finishing column which is recycled through the process to gain use of residual inhibitor.

The present invention is suitable for use in virtually any type of separation of a polymerizable ethylenically unsaturated monomer wherein the monomer is subjected to temperatures above room temperature. Thus, the process of the present invention has been found particularly useful in vacuum distillation techniques, the preferred method for separating unstable organic liquid mixtures. The amount of polymerization inhibitor added may vary over a wide range depending upon the conditions of distillation. Generally, the degree of stabilization is proportional to the amount of inhibitor added. In accordance with the present invention, it has been found that inhibitor blend concentrations generally between about 1 ppm and about 2000 ppm by weight have generally provided suitable results, depending primarily upon the temperature of the distillation mixture and the degree of inhibition desired. More often, however, with the inhibitor blend of the present invention it is used in concentrations of 50 to 1000 ppm.

The polymerization inhibitor blend of the present invention may be introduced into the distillation apparatus in any convenient manner which permits efficient distribution of the inhibitor throughout the apparatus. Typically and most advantageously, the required amount of inhibitor blend is simply added to the reboiler area of the distillation column, although equivalent results may be obtained by incorporating the inhibitor blend into the incoming hot stream of monomer. Also, the inhibitor blend may be added at both reboiler and directly into the distillation column. Either and/or both methods of addition provide a distribution of inhibitor blend which is commensurate with the distribution of monomer within the distillation system and is essential for effective polymerization inhibition.

It is generally necessary to maintain the appropriate amount of inhibitor blend in the distillation apparatus by adding inhibitor components, either separately or after they have been pre-blended, during the course of the distillation process, either on a generally continuous basis or on an intermittent basis. The means by which the maintenance of the necessary concentration of the inhibitor blend is carried out is of no particular importance as long as the concentration of inhibitor blend is kept above or about the minimum required level.

One method by which the amount of inhibitor blend which is gradually depleted during distillation and the increased cost necessitated thereby may be minimized is by recycling a portion of the distillation residue or tar back into the distillation system. The distillation residue may contain a substantial quantity of one or components of the polymerization inhibitor blend which may be re-utilized in the distillation system with a concomitant reduction in the process requirements for additional inhibitor blend. Moreover, by recycling a portion of the tar, the amount of inhibitor blend within the distillation system may be significantly increased, thereby enhancing protection against polymerization within the system.

The tar may be recycled back into the distillation system at any desirable point therein such as would be obvious to those skilled in the art. However, in a typical distillation train comprising a first fractionation column, a recycle column, and a finishing column, adequate inhibitor protection within the recycle column has been found to be essential to the elimination of thermal polymer, since the high distillation temperatures necessary to achieve adequate fractionation between the similar boiling compounds separated therein causes the formation of a substantial portion of the total thermal polymer formed within the distillation system as a whole. Indeed, with conventional processes, approximately 80% of the total thermal polymer formed is attributable to the recycle column. Accordingly, in the preferred embodiment, the portion of tar recycled is recycled to at least the recycle column, and preferably into the lower regions of the recycle column in order to provide a locus of inhibitor distribution which corresponds to the distribution of ethylenically unsaturated monomer therein. Optionally, additional tar may be recycled for addition back into the distillation system at other points, such as, for example, back into the first fractionation column.

One convenient method by which the tar may be recycled back into the distillation system is simply by incorporating the tar into an incoming feed of monomer or inhibitor. The amount of tar which is recycled back into the distillation system relative to the amount of feed may comprise any desirable amount. A larger amount of tar recycle will increase the loading of inhibitor blend within the distillation system. However, larger amounts of tar recycle will also increase the volume of bottoms material, and the amount of tar recycle will necessarily be constrained thereby.

The high purity overhead product withdrawn from the distillation apparatus will generally contain above about 97% and typically above about 99% by weight ethylenically unsaturated monomer, depending upon the ultimate use. The bottoms product may contain polymeric material, undistilled monomer and unspent inhibitor blend. This fraction is withdrawn from the distillation apparatus for further processing. In one particularly preferred embodiment of the present invention, a portion of the bottoms product, containing substantial amounts of re-useable inhibitor, is recycled for introduction into the distillation apparatus. The recycled portion of the bottoms product may be added to the distillation apparatus by any method known to those skilled in the art. Best results are obtained by adding the recycled portion at a location in the distillation apparatus which will yield a distribution of inhibitor blend which coincides with the distribution of monomer therein. By recycling the inhibitor-containing bottoms, the inhibitor blend may thus be reused, accruing thereby a significant reduction in the process requirements for inhibitor.

The advantages and the important features of the present invention will be more apparent from the following examples.

In the examples, styrene, which is representative of ethylenically unsaturated monomers, is used as the test monomer.

EXAMPLES 1–2 AND COMPARATIVE EXAMPLES 1–3

Preparation of Feed Solution

Tert-Butylcatechol (TBC) is removed from commercially available styrene by distillation under vacuum. The desired amount of inhibitor(s) is added to this TBC-free styrene either directly or by first making a concentrated solution of the inhibitor in TBC-free styrene followed by further dilution with TBC-free styrene.

Procedure for Dynamic Reboiler Test under Ambient Conditions

A quantity of the Feed Solution containing inhibitor(s) at the desired charge(s) (stated as a wt/wt total inhibitor to styrene) is added to a round-bottom flask (the "Pot") and heated to the desired temperature (110° C.) and brought to reflux by adjusting the pressure/vacuum. Once the Pot contents are at temperature, a continuous stream of fresh Feed Solution is begun at a rate that will add the volume of the initial Pot solution to the Pot over a period of time called the residence time (one hour). At the same time that the fresh Feed Solution flow is begun, the Bottoms Stream flow is also begun. The Bottoms Stream is solution in the Pot that is removed at the same rate as the fresh Feed Solution is added. The experiment continues with flow in and out of the Pot for a specified period of time, typically six hours. Samples are collected hourly from the Bottoms Stream. These samples are analyzed for polymer content via the methanol turbidity method.

This procedure simulates the way inhibitors are used in a distillation train of a plant producing vinyl monomers. The amount of polymer in the samples is an indication of effectiveness of the inhibitor being tested. The lower the amount of polymer in the hourly samples, the more effective the inhibiting system should be during normal operation of a continuous manufacturing or purification process.

It should be noted that the methanol tubidity method for polymer analysis usually involves absorbance readings at 420 nm. We have found that some C-nitrosoanilines have absorbances that interfere with polymer analysis at this wavelength. Thus, polymer was quantified at 600 nm instead of 420 nm.

Procedure for Dynamic Reboiler Test under Air Injection

This procedure is the same as that under ambient conditions except that a gas sparging tube is inserted into the contents of the Pot. Air is injected through this sparging tube at a rate of 3 cc/min throughout the test.

Procedure for Feed Shut-Off

At the end of the Reboiler Test Run (typically six hours), a sample is collected from the Bottoms Stream. This sample corresponds to Feed Shut-Off Time=0 minutes. The flows of fresh Feed Solution and Bottoms Stream are stopped. The vacuum and temperature are monitored and adjusted to maintain boiling at the desired temperature of the experiment. If gas injection is being used, the injection of the gas is continued at the designated rate throughout feed shut-off. Samples are periodically removed from the Pot (typically every ten minutes). These samples are analyzed for polymer content via the methanol turbidity method. The lower the polymer number at a specific length of time after feed shut-off, the more effective the inhibitor system at providing protection for that length of time.

The results of these experiments are shown in the table below.

| Example | Inhibitor | Charge | Atmospheric sparge | Steady State Polymer | Polymer 60 min. after feed shut-off |
|---|---|---|---|---|---|
| Comparative Example 1 | 4-nitroso-o-cresol | 50 ppm | None (ambient) | 0.16 wt % | 1.48 wt % |
| Comparative Example 2 | 4-nitroso-N-(1,4-dimethyl-pentyl)aniline | 50 ppm | None (ambient) | 0.002 wt % | 4.37 wt % |
| Example 1 | 4-nitroso-o-cresol/4-nitroso-N-(1,4-dimethyl-pentyl)aniline | 25 ppm/ 25 ppm | None (ambient) | 0.21 wt % | 1.92 wt % |
| Example 2 | 4-nitroso-o-cresol/ 4-nitroso-N-(1,4-dimethyl-pentyl)aniline | 25 ppm/ 25 ppm | Air (3 cc/min) | 0.0006 wt % | 0.0009 wt % |
| Comparative Example 3 | 4-nitroso-o-cresol | 50 ppm | Air (3 cc/min) | 0.04 wt % | 0.10 wt % |

These results clearly show that nitrosophenol compounds (Comparative Example 1) and nitrosoaniline compounds (Comparative Example 2) generally are very effective inhibitors for ethylenically unsaturated monomers such as styrene, and that their blends (Example 1) exhibit comparable inhibition activity at steady state, and unexpectedly superior inhibition activity after feed shut-off. These data also show a dramatic improvement in inhibition activity when the blend is combined with air.

What is claimed is:

1. A process for inhibiting the premature polymerization of an ethylenically unsaturated monomer during production, distillation, purification or storage of the monomer, which comprises: incorporating in the monomer, in an effective inhibiting amount sufficient to prevent premature polymerization during production, distillation, purification or storage of said monomer, a blend comprising at least one C-nitrosoaniline compound and at least one nitrosophenol selected from the group consisting of 4-nitrosophenol, 2-nitrosophenol, 4-nitroso-o-cresol, 2-nitroso-p-cresol, 2-tert-butyl-4-nitrosophenol, 4-tert-butyl-2-nitrosophenol, 2,6-di-tert-butyl-4-nitrosophenol, 2-tert-amyl-4-nitrosophenol, 4-tert-amyl-2-nitrosophenol, 2,6-di-tert-amyl-4-nitrosophenol, 2-nitroso-1-naphthol, 4-nitroso-1-naphthol, 2-tert-butyl-4-nitroso-1-naphthol, 1-nitroso-2-naphthol, 6-nitroso-2-naphthol and 2-tert-amyl-nitroso-1-naphthol.

2. A process according to claim 1 wherein the blend further comprises oxygen or air.

3. A process according to claim 1 wherein the inhibition of premature polymerization of the ethylenically unsaturated monomer occurs during distillation or purification.

4. A process according to claim 1 wherein the distillation or purification is conducted at a temperature from 50° C. to 150° C.

5. A process according to claim 1 wherein the at least one nitrosophenol is selected from the group consisting of 4-nitrosophenol, 4-nitroso-o-cresol, 2-tert-butyl-4-nitrosophenol, 2,6-di-tert-butyl-4-nitrosophenol, 2-tert-amyl-4-nitrosophenol, 2-nitroso-1-naphthol, 4-nitroso-1-naphthol, 2-tert-butyl-4-nitroso-1-naphthol and 1-nitroso-2-naphthol.

6. A process for inhibiting the premature polymerization of an ethylenically unsaturated monomer during production, distillation, purification or storage of the monomer, which comprises: incorporating in the monomer, in an effective inhibiting amount sufficient to prevent premature polymerization during production, distillation, purification or storage of said monomer, a blend comprising at least one nitrosophenol compound and at least one C-nitrosoaniline compound selected from the group consisting of: 4-nitroso-N-(1,4-dimethylpentyl)aniline, 4-nitroso-N-phenylaniline, 4-nitroso-N-isopropylaniline, 4-nitroso-N,N-dimethylaniline, 4-nitroso-N,N-diethylaniline, 4-nitroso-N,N-diphenylaniline, 4-nitroso-N,N-diisopropylaniline, 4-nitrosoaniline, 2-nitroso-N-(1,4-dimethylpentyl)aniline, 2-nitroso-N-phenylaniline, 2-nitroso-N,N-dimethylaniline, 2-nitroso-N,N-diethylaniline, 2-nitroso-N,N-diphenylaniline, 2-nitrosoaniline, 2-t-butyl-4-nitroso-N-(1,4-dimethylpentyl)aniline, 2-methyl-4-nitroso-N-(1,4-dimethylpentyl)aniline, 2-t-butyl-4-nitroso-N-phenylaniline, 2-methyl-4-nitroso-N-phenylaniline, 4-t-butyl-2-nitroso-N-(1-,4-dimethylpentyl)aniline, 4-t-butyl-2-nitroso-N-phenylaniline, 4t-butyl-2-nitroso-N,N-dimethylaniline, 4-t-butyl-2-nitroso-N,N-diethylaniline, 4t-butyl-1-2-nitroso-N,N-diphenylaniline, 4-nitroso-N-(1,3-dimethyl-butyl)aniline, 2-nitroso-N-(1,3-dimethylbutyl)aniline and 4-t-butyl-2-nitrosoaniline.

7. A process according to claim 6 wherein the at least one C-nitrosoaniline is selected from the group consisting of 4-nitroso-N-(1,4-dimethylpentyl)aniline, 4-nitroso-N-p-henylaniline, 4-nitroso-N-isopropylaniline, 4-nitroso-N,N-dimethylaniline, 4-nitroso-N,N-diethylaniline, 4-nitroso-N,N-diphenylaniline, 4-nitroso-N,N-diisopropylaniline, 4-nitrosoaniline, 2-t-butyl-4-nitroso-N-(1,4-dimethylpentyl)aniline, 2-methyl-4-nitroso-N-(1,4-dimethylpentyl)aniline, 2-t-butyl-4-nitroso-N-phenylaniline and 2-methyl-4-nitroso-N-phenylaniline.

8. A process according to claim 6 wherein the blend further comprises oxygen or air.

9. A process according to claim 6 wherein the inhibition of premature polymerization of the ethylenically unsaturated monomer occurs during distillation or purification.

10. A process according to claim 9 wherein the distillation or purification is conducted at a temperature from 50° C. to 150° C.

11. A method for distilling a feed comprising at least one polymerizable ethylenically unsaturated monomer, said method comprising the steps of: introducing a feed comprising at least one polymerizable ethylenically unsaturated monomer into a distillation apparatus; introducing an effective inhibiting amount, sufficient to prevent premature polymerization of said ethylenically unsaturated monomer, of a blend comprising at least one nitrosophenol compound and at least one C-nitrosoaniline compound selected from the group consisting of: 4-nitroso-N-(1-,4-dimethylpentyl)aniline, 4-nitroso-N-phenylaniline 4-nitroso-N-isopropylaniline, 4-nitroso-N,N-dimethylaniline, 4-nitroso-N,N-diethylaniline, 4-nitroso-N,N-diphenylaniline, 4-nitroso-N,N-diisopropylaniline, 4-nitrosoaniline, 2-nitroso-N-(1-,4-dimethylpentyl)aniline, 2-nitroso-N-phenylaniline, 2-nitroso-N,N-dimethylaniline, 2-nitroso-N,N-diethylaniline, 2-nitroso-N,N-diphenylaniline, 2-nitrosoaniline, 2-t-butyl-4-nitroso-N-(1-4-dimethylpentyl)aniline, 2-methyl-4-nitroso-N-(1-,4-dimethylpentyl)aniline, 2-t-butyl-4-nitroso-N-phenylaniline, 2-methyl-4-nitroso-N-phenylaniline, 4-t-butyl-2-nitroso-N-(1-4-dimethylpentyl)aniline, 4-t-butyl-2-nitroso-N-phenylaniline, 4-t-butyl=2-nitroso-N,N-dimethylaniline, 4-t-butyl-2-nitroso-N,N-diethylaniline, 4-t-butyl-2-nitroso-N,N-diphenylaniline, 4-nitroso-N-(1,3-dimethyl- butyl)aniline, 2-nitroso-N- (1,3-dimethylbutyl)aniline and 4-t-butyl-2-nitrosoaniline, into said distillation apparatus; and distilling said feed under distillation conditions in the presence of said inhibitor blend to recover from said distillation apparatus an overhead product of high purity ethylenically unsaturated monomer and a residual bottoms fraction having a reduced content of polymeric material.

12. A method for distilling a feed comprising at least one polymerizable ethylenically unsaturated monomer, said method comprising the steps of: introducing a feed comprising at least one polymerizable ethylenically unsaturated monomer into a distillation apparatus; introducing an effective inhibiting amount, sufficient to prevent premature polymerization of said ethylenically unsaturated monomer, of a blend comprising at least one C-nitrosoaniline compound and at least one nitrosophenol selected from the group consisting of 4-nitroso-N-(1,4-dimethylpentyl)aniline, 4-nitroso-N-phenylaniline, 4-nitroso-N-isopropylaniline, 4-nitroso-N,N-dimethylaniline, 4-nitroso-N,N-diethylaniline, 4-nitroso-N,N-diphenylaniline, 4-nitroso-N,N-diisopropylaniline, 4-nitrosoaniline, 2-nitroso-N-(1,4-dimethylpentyl)aniline, 2-nitroso-N-phenylaniline, 2-nitroso-N,N-dimethylaniline, 2-nitroso-N,N-diethylaniline, 2-nitroso-N,N-diphenylaniline, 2-nitrosoaniline, 2-t-butyl-4-nitroso-N-(1,4-dimethylpentyl)aniline, 2-methyl-4-nitroso-N-(1,4-dimethylpentyl)aniline, 2-t-butyl-4-nitroso-N-phenylaniline, 2-methyl-4-nitroso-N-phenylaniline, 4-t-butyl-2-nitroso-N-(1-,4-dimethylpentyl)aniline, 4-t-butyl-2-nitroso-N-phenylaniline, 4-t-butyl-2-nitroso-N,N-dimethylaniline, 4-t-butyl-2-nitroso-N,N-diethylaniline, 4-t-butyl-2-nitroso-N,N-diphenylaniline, 4-nitroso-N-(1 ,3-dimethyl- butyl)aniline, 2-nitroso-N-(1,3-dimethylbutyl)aniline and 4-t-butyl-2-nitrosoaniline, into said distillation apparatus; and distilling said feed under distillation conditions in the presence of said inhibitor blend to recover from said distillation apparatus an overhead product of high purity ethylenically unsaturated monomer and a residual bottoms fraction having a reduced content of polymeric material.

* * * * *